(12) United States Patent
Strohmaier et al.

(10) Patent No.: US 8,529,868 B2
(45) Date of Patent: Sep. 10, 2013

(54) ITQ-40, NEW CRYSTALLINE MICROPOROUS MATERIAL

(75) Inventors: Karl G. Strohmaier, Port Murray, NJ (US); Avelino Corma, Valencia (ES); Maria Jose Diaz, Valencia (ES); Fernando Rey, Valencia (ES); Douglas L. Dorset, Milford, NJ (US); Stuart L. Soled, Pittstown, NJ (US)

(73) Assignee: Exxonmobil Research and Engineering Company, Annandale, NJ (US)

( * ) Notice: Subject to any disclaimer, the term of this patent is extended or adjusted under 35 U.S.C. 154(b) by 366 days.

(21) Appl. No.: 12/968,548

(22) Filed: Dec. 15, 2010

(65) Prior Publication Data

US 2011/0160487 A1 Jun. 30, 2011

Related U.S. Application Data

(60) Provisional application No. 61/335,102, filed on Dec. 31, 2009.

(51) Int. Cl.
*C01B 39/00* (2006.01)
*C01B 39/04* (2006.01)
*C01B 39/46* (2006.01)
*C01B 39/52* (2006.01)
*C01B 39/54* (2006.01)
*B01J 29/06* (2006.01)
*B01J 29/70* (2006.01)
*B01J 20/28* (2006.01)

(52) U.S. Cl.
CPC .................. *C01B 39/54* (2013.01); *C01B 39/46* (2013.01); *C01B 39/52* (2013.01); *C01B 39/04* (2013.01); *C01B 39/00* (2013.01); *B01J 29/06* (2013.01); *B01J 29/70* (2013.01); *B01J 20/28095* (2013.01)
USPC ........ 423/700; 423/702; 423/718; 423/328.2; 423/329.1; 502/60; 502/61

(58) Field of Classification Search
USPC .................. 423/700, 702, 718, 328.2, 329.1; 502/60, 61
See application file for complete search history.

(56) References Cited

U.S. PATENT DOCUMENTS

| 4,310,440 A | 1/1982 | Wilson et al. |
| 4,440,871 A | 4/1984 | Lok et al. |
| 2006/0110321 A1* | 5/2006 | Corma et al. .................. 423/718 |

OTHER PUBLICATIONS

Dorset, Douglas L. et al., "P-Derived Organic Cations as Structure-Directing Agents: Synthesis of a High-Silica Zeolite (ITQ-27) with a Two-Dimensional 12-Ring Channel System", J. Am. Chem. Soc., vol. 128, No. 27, Jun. 16, 2006, pp. 8862-8867, XP002621358,DOI: 10.1021/ja061206o.
Dorset, Douglas L. et al, "Crystal Structure of ITQ-26, a 3D Framework with Extra-Large Pores", Chem. Mater., vol. 20, No. 16, Jul. 11, 2008, pp. 5325-5331, XP002621359, DOI: 10.1021/cm801126t.

(Continued)

*Primary Examiner* — David M Brunsman
(74) *Attorney, Agent, or Firm* — Liza Montalvo; David Weisberg (57) ABSTRACT

ITQ-40 (INSTITUTO DE TECNOLOGÍA QUÍMICA number 40) is a new crystalline microporous material with a framework of tetrahedral atoms connected by atoms capable of bridging the tetrahedral atoms, the tetrahedral atom framework being defined by the interconnections between the tetrahedrally coordinated atoms in its framework. ITQ-40 can be prepared in silicate compositions with an organic structure directing agent. It has a unique X-ray diffraction pattern, which identifies it as a new material.

17 Claims, 3 Drawing Sheets

X-ray diffraction pattern of as-synthesized ITQ-40 measured with CuKα radiation.

(56) References Cited

OTHER PUBLICATIONS

Corma, Avelino et al., "A Zeolitic Structure (ITQ-34) with Connected 9- and 10-Ring Channels Obtained with Phosphonium Cations as Structure Directing Agents", J. Am. Chem. Soc., vol. 130, No. 49, Nov. 17, 2008, pp. 16482-16483, XP002621357, DOI: 10.1021/ja806903c.

Corma, Avelino et al., "High-throughput synthesis and catalytic properties of a molecular sieve with 18- and 10-member rings", Nature, vol. 443, Oct. 19, 2006, pp. 842-845, XP002667329.

Camblor, Migues A. et al., "High silica zeolites with three-dimensional systems of large pore channels", Microporous and Mesoporous Materials, Elsevier Science Publishing, New York, US, vol. 48, No. 1-3, Nov. 1, 2001, pp. 11-22, XP004332122, ISSN: 1387-1811, DOI: 10.1016/S1387-1811(01)00325-0.

* cited by examiner

FIGURE 1

Framework structure of ITQ-40
(showing only the tetrahedral atoms and the connectivity between them)
There is one unit cell, whose edges are defined by the gray box

FIGURE 2

X-ray diffraction pattern of as-synthesized ITQ-40 measured with CuKα radiation.

FIGURE 3

X-ray diffraction pattern of calcined ITQ-40 measured with CuKα radiation.

ITQ-40, NEW CRYSTALLINE MICROPOROUS MATERIAL

This application claims benefit of U.S. Provisional Application 61/335,102 filed Dec. 31, 2009.

BACKGROUND OF THE INVENTION

Microporous materials, including zeolites and silicoaluminophosphates, are widely used in the petroleum industry as to absorbents, catalysts and catalyst supports. Their crystalline structures consist of three-dimensional frameworks of tetrahedral atoms containing uniform pore openings, channels and internal cages of dimensions (<20 Å) similar to most hydrocarbons. The composition of the frameworks can be such that they are anionic, which requires the presence of non-framework cations to balance the is negative charge. These non-framework cations, such as alkali or alkaline earth metal cations, are exchangeable, and if converted to the proton form, impart the material with Brønsted acid sites having catalytic activity. The combination of acidity and restricted pore openings gives these materials catalytic properties unavailable with other materials due to their ability to exclude or restrict some of the products, reactants, and/or transition states in many reactions. Non-reactive materials, such as pure silica and aluminophosphate frameworks are also useful and can be used in absorption and separation processes of reactive molecules such as alkenes.

The family of crystalline microporous compositions known as molecular sieves, which exhibit the ion-exchange and/or adsorption characteristics of zeolites are the aluminophosphates, identified by the acronym AlPO, and substituted aluminophosphates as disclosed in U.S. Pat. Nos. 4,310,440 and 4,440,871. U.S. Pat. No. 4,440,871 discloses a class of silica aluminophosphates, which are identified by the acronym SAPO and which have different structures as identified by their X-ray diffraction pattern. The structures are identified by a numerical number after AlPO, SAPO, MeAPO (Me=metal), etc. (Flanigen et al., *Proc. 7th Int. Zeolite Conf.*, p. 103 (1986) and may include Al and P substitutions by B, Si, Be, Mg, Ge, Zn, Fe, Co, Ni, etc.

ExxonMobil and others extensively use various microporous materials, such as faujasite, mordenite, and ZSM-5 in many commercial applications. Such applications include reforming, cracking, hydrocracking, alkylation, oligomerization, dewaxing and isomerization. Any new material has the potential to improve the catalytic performance over those catalysts presently employed.

There exists the need for new structures, having different properties than those of known materials, for improving the performance of many hydrocarbon processes. There are currently about 191 known microporous framework structures as tabulated by the International Zeolite Association. Each structure has unique pore, channel and cage dimensions, which gives its particular properties as described above. ITQ-40 is a new framework material.

SUMMARY OF THE INVENTION

ITQ-40 (INSTITUTO DE TECNOLOGÍA QUÍMICA number 40) is a new crystalline microporous material having a framework of tetrahedral atoms connected by bridging atoms, the tetrahedral atom framework being defined by the interconnections between the tetrahedrally coordinated atoms in its framework.

In one embodiment, there is provided a new as-synthesized crystalline material having a unique X-ray diffraction pattern and having a composition of $aR:YO_2:bX_2O_3:cF:dH_2O$, where R is an organic structure directing agent; Y is Si alone or in combination with any other tetravalent metal capable of tetrahedral coordination, preferably Ti, Zr, or Ge; X is any metal capable of tetrahedral coordination, preferably X is one or more of B, Al, Ga, Fe, Li, Be, P, Zn, Cr, Mg, Cu, Co, Ni, Mn, As, In, Sn, or Sb, more preferably X is Al or B; F is a source of fluoride, and a ranges from about 0.01 to about 0.5, b ranges from 0 to about 0.2, c ranges from about 0.01 to about 0.5, and d ranges from 0 to about 1.

In another embodiment, there is provided a new calcined crystalline material having a unique X-ray diffraction pattern and having a composition of $YO_2:bX_2O_3:dH_2O$, where Y is Si alone or in combination with any other tetravalent metal capable of tetrahedral coordination, preferably Ti, Zr, or Ge; X is any metal capable of tetrahedral coordination, preferably X is one or more of B, Al, Ga, Fe, Li, Be, P, Zn, Cr, Mg, Cu, Co, Ni, Mn, As, In, Sn, or Sb, more preferably X is Al or B; and, b ranges from 0 to about 0.2, and d ranges from 0 to about 1.

Figure 1:
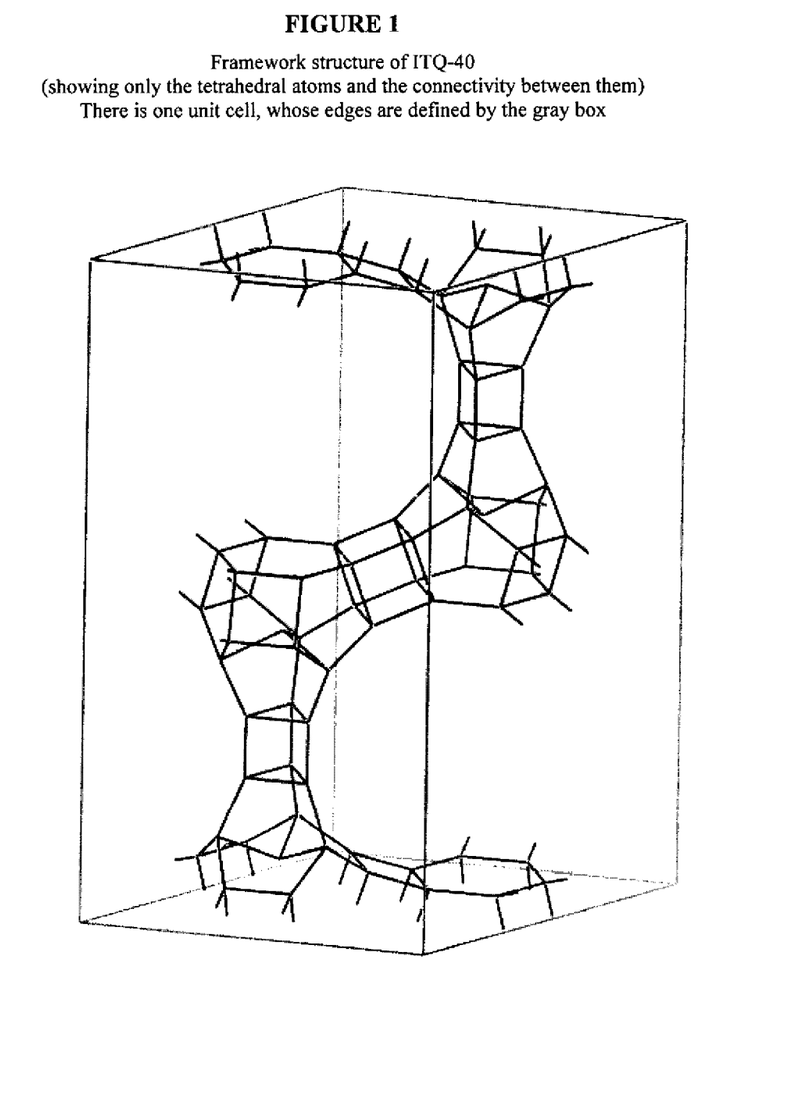
FIG. 1 is a representation of the framework structure of ITQ-40 showing only the tetrahedral atoms of one unit cell.
Figure 2:
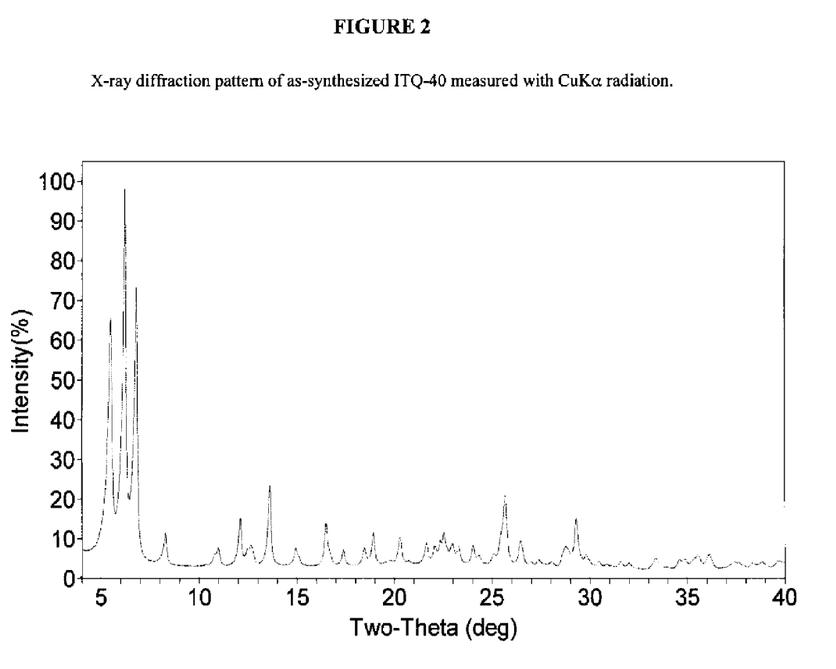
FIG. 2 is a representation of the X-ray diffraction pattern of as-synthesized ITQ-40 measured with CuKα radiation.

In another embodiment, there is provided a method of synthesizing a crystalline microporous composition having the diffraction pattern similar to FIG. 2, comprising mixing together water with a source of silica, preferably, a source of silica and a source of tetravalent metal, a source of fluoride, an organic structure directing agent, and optionally a source of trivalent metal or other metal capable of tetrahedral coordination. Preferably, the organic structure directing agent is diphenyldimethylphosphonium hydroxide or diphenyldiethylphosphonium hydroxide.

In still another embodiment, there is provided a method of using ITQ-40 to separate hydrocarbons from a hydrocarbon containing stream.

In still another embodiment, there is provided a method of using ITQ-40 as a hydrocarbon conversion catalyst for converting an organic feedstock to conversion products.

Other objects and advantages of the present invention will become apparent from the detailed description that follows.

DETAILED DESCRIPTION OF THE PREFERRED EMBODIMENTS

The present invention is a new structure of a crystalline material. ITQ-40 is a three-dimensional large-pore zeolite having an interrupted framework and double three-ring (D3R) and double four-ring (D4R) building units. The ITQ-40 structure is porous and contains intersecting 16 and 15-ring channels.

As with any porous crystalline material, the structure of ITQ-40 can be defined by the interconnections between the tetrahedrally coordinated atoms in its framework. In particular, ITQ-40 has a framework of tetrahedral atoms connected by bridging atoms such that the tetrahedral atoms have the connectivity as listed in Table 1. The tetrahedral atom framework is defined by connecting the nearest tetrahedral (T) atoms in the manner shown in Table 1 below.

TABLE 1

ITQ-40 tetrahedral atom interconnections

| T Atom | Connect to: |
|---|---|
| T1 | T7, T8, T28, T69 |
| T2 | T10, T27, T66, T68 |
| T3 | T10, T18, T48, T67 |
| T4 | T9, T13, T43, T47 |
| T5 | T16, T21, T25 |
| T6 | T11, T12, T37, T67 |
| T7 | T1, T36, T66, T70 |
| T8 | T1, T18, T43, T65 |
| T9 | T4, T13, T42, T52 |
| T10 | T2, T3, T33, T65 |
| T11 | T6, T32, T68, T70 |
| T12 | T6, T18, T52, T69 |
| T13 | T4, T9, T48, T51 |
| T14 | T20, T21, T41, T75 |
| T15 | T23, T40, T72, T74 |
| T16 | T5, T23, T35, T73 |
| T17 | T22, T26, T30, T34 |
| T18 | T3, T8, T12 |
| T19 | T24, T25, T50, T73 |
| T20 | T14, T49, T72, T76 |
| T21 | T5, T14, T30, T71 |
| T22 | T17, T26, T29, T39 |
| T23 | T15, T16, T46, T71 |
| T24 | T19, T45, T74, T76 |
| T25 | T5, T19, T39, T75 |
| T26 | T17, T22, T35, T38 |
| T27 | T2, T33, T34, T57 |
| T28 | T1, T36, T54, T56 |
| T29 | T22, T36, T44, T55 |
| T30 | T17, T21, T35, T39 |
| T31 | T42, T47, T51 |
| T32 | T11, T37, T38, T55 |
| T33 | T10, T27, T54, T58 |
| T34 | T17, T27, T44, T53 |
| T35 | T16, T26, T30, T39 |
| T36 | T7, T28, T29, T53 |
| T37 | T6, T32, T56, T58 |
| T38 | T26, T32, T44, T57 |
| T39 | T22, T25, T30, T35 |
| T40 | T15, T46, T47, T63 |
| T41 | T14, T49, T60, T62 |
| T42 | T9, T31, T49, T61 |
| T43 | T4, T8, T48, T52 |
| T44 | T29, T34, T38 |
| T45 | T24, T50, T51, T61 |
| T46 | T23, T40, T60, T64 |
| T47 | T4, T31, T40, T59 |
| T48 | T3, T13, T43, T52 |
| T49 | T20, T41, T42, T59 |
| T50 | T19, T45, T62, T64 |
| T51 | T13, T31, T45, T63 |
| T52 | T9, T12, T43, T48 |
| T53 | T34, T36, T56, T66 |
| T54 | T28, T33, T57, T65 |
| T55 | T29, T32, T58, T70 |
| T56 | T28, T37, T53, T69 |
| T57 | T27, T38, T54, T68 |
| T58 | T33, T37, T55, T67 |
| T59 | T47, T49, T62, T72 |
| T60 | T41, T46, T63, T71 |
| T61 | T42, T45, T64, T76 |
| T62 | T41, T50, T59, T75 |
| T63 | T40, T51, T60, T74 |
| T64 | T46, T50, T61, T73 |
| T65 | T8, T10, T54, T68 |
| T66 | T2, T7, T53, T69 |
| T67 | T3, T6, T58, T70 |
| T68 | T2, T11, T57, T65 |
| T69 | T1, T12, T56, T66 |
| T70 | T7, T11, T55, T67 |
| T71 | T21, T23, T60, T74 |
| T72 | T15, T20, T59, T75 |

TABLE 1-continued

ITQ-40 tetrahedral atom interconnections

| T Atom | Connect to: |
|---|---|
| T73 | T16, T19, T64, T76 |
| T74 | T15, T24, T63, T71 |
| T75 | T14, T25, T62, T72 |
| T76 | T20, T24, T61, T73 |

Tetrahedral atoms are those capable of having tetrahedral coordination, including one or more of, but not limiting, lithium, beryllium, boron, magnesium, aluminum, silicon, phosphorous, titanium, chromium, manganese, iron, cobalt, nickel, copper, zinc, zirconium, gallium, germanium, arsenic, indium, tin, and antimony. Bridging atoms are those capable of connecting two tetrahedral atoms, examples which include, but not limiting, oxygen, nitrogen, fluorine, sulfur, selenium, and carbon atoms.

In the case of oxygen, it is also possible that the bridging oxygen is also connected to a hydrogen atom to form a hydroxyl group (—OH—). In the case of carbon it is also possible that the carbon is also connected to two hydrogen atoms to form a methylene group (—$CH_2$—). For example, bridging methylene groups have been seen in the zirconium diphosphonate, MIL-57. See: C. Serre, G. Férey, *J. Mater. Chem.* 12, p. 2367 (2002). Bridging sulfur and selenium atoms have been seen in the UCR-20-23 family of microporous materials. See: N. Zheng, X. Bu, B. Wang, P. Feng, *Science* 298, p. 2366 (2002). Bridging fluorine atoms have been seen in lithium hydrazinium fluoroberyllate, which has the ABW structure type. See: M. R. Anderson, I. D. Brown, S. Vilminot, *Acta Cryst.* B29, p. 2626 (1973).

In addition to describing the ITQ-40 structure by the interconnections of the tetrahedral atoms as in Table 1, the structure may be defined by its unit cell, which is the smallest repeating unit containing all the structural elements of the material. Table 2 provides the typical positions of each tetrahedral atom in the unit cell in units of Ångström. The values are approximate and are typical when T is silicon and the bridging atoms are oxygen. Since tetrahedral atoms may move about due to other crystal forces (presence of inorganic or organic species, for example), or by the choice of tetrahedral and bridging atoms, a range of ±0.50 Ångström is implied for the x and y coordinate positions and a range of ±1.0 Ångström for the z coordinate positions.

TABLE 2

Positions of tetrahedral (T) atoms for the ITQ-40 structure.

| Atom | x | y | z |
|---|---|---|---|
| T1 | 12.29 | 5.27 | 18.14 |
| T2 | −1.58 | 12.22 | 17.11 |
| T3 | 5.61 | 3.24 | 19.83 |
| T4 | 9.69 | 3.87 | 25.63 |
| T5 | 0.00 | 9.47 | 2.48 |
| T6 | 5.69 | 8.01 | 18.14 |
| T7 | −1.59 | 6.72 | 17.11 |
| T8 | 10.79 | 3.24 | 19.83 |
| T9 | 8.20 | 6.45 | 25.63 |
| T10 | 6.62 | 0.92 | 18.14 |
| T11 | 3.17 | 9.46 | 17.11 |
| T12 | 8.20 | 7.73 | 19.83 |
| T13 | 6.71 | 3.87 | 25.63 |
| T14 | −4.09 | 8.93 | 2.04 |
| T15 | 9.78 | 1.98 | 1.01 |
| T16 | 2.59 | 10.96 | 3.73 |
| T17 | −1.49 | 10.33 | 9.53 |

TABLE 2-continued

Positions of tetrahedral (T) atoms for the ITQ-40 structure.

| Atom | x | y | z |
|---|---|---|---|
| T18 | 8.20 | 4.73 | 18.58 |
| T19 | 2.51 | 6.19 | 2.04 |
| T20 | 9.79 | 7.48 | 1.01 |
| T21 | −2.59 | 10.96 | 3.73 |
| T22 | 0.00 | 7.75 | 9.53 |
| T23 | 1.58 | 13.28 | 2.04 |
| T24 | 5.03 | 4.74 | 1.01 |
| T25 | 0.00 | 6.48 | 3.73 |
| T26 | 1.49 | 10.33 | 9.53 |
| T27 | −1.58 | 13.28 | 14.05 |
| T28 | 11.37 | 4.74 | 15.09 |
| T29 | 0.00 | 6.48 | 12.37 |
| T30 | −1.49 | 10.33 | 6.56 |
| T31 | 8.20 | 4.73 | 29.71 |
| T32 | 4.09 | 8.93 | 14.05 |
| T33 | 6.62 | 1.98 | 15.09 |
| T34 | −2.59 | 10.96 | 12.37 |
| T35 | 1.49 | 10.33 | 6.56 |
| T36 | −2.51 | 6.19 | 14.05 |
| T37 | 6.61 | 7.48 | 15.09 |
| T38 | 2.59 | 10.96 | 12.37 |
| T39 | 0.00 | 7.75 | 6.56 |
| T40 | 9.78 | 0.92 | 30.15 |
| T41 | −3.17 | 9.46 | 31.19 |
| T42 | 8.20 | 7.73 | 28.46 |
| T43 | 9.69 | 3.87 | 22.66 |
| T44 | 0.00 | 9.47 | 13.62 |
| T45 | 4.11 | 5.27 | 30.15 |
| T46 | 1.58 | 12.22 | 31.19 |
| T47 | 10.79 | 3.24 | 28.46 |
| T48 | 6.71 | 3.87 | 22.66 |
| T49 | 10.71 | 8.01 | 30.15 |
| T50 | 1.59 | 6.72 | 31.19 |
| T51 | 5.61 | 3.24 | 28.46 |
| T52 | 8.20 | 6.45 | 22.66 |
| T53 | −4.09 | 8.93 | 14.05 |
| T54 | 9.78 | 1.98 | 15.09 |
| T55 | 2.51 | 6.19 | 14.05 |
| T56 | 9.79 | 7.48 | 15.09 |
| T57 | 1.58 | 13.28 | 14.05 |
| T58 | 5.03 | 4.74 | 15.09 |

TABLE 2-continued

Positions of tetrahedral (T) atoms for the ITQ-40 structure.

| Atom | x | y | z |
|---|---|---|---|
| T59 | 12.29 | 5.27 | 30.15 |
| T60 | −1.58 | 12.22 | 31.19 |
| T61 | 5.69 | 8.01 | 30.15 |
| T62 | −1.59 | 6.72 | 31.19 |
| T63 | 6.62 | 0.92 | 30.15 |
| T64 | 3.17 | 9.46 | 31.19 |
| T65 | 9.78 | 0.92 | 18.14 |
| T66 | −3.17 | 9.46 | 17.11 |
| T67 | 4.11 | 5.27 | 18.14 |
| T68 | 1.58 | 12.22 | 17.11 |
| T69 | 10.71 | 8.01 | 18.14 |
| T70 | 1.59 | 6.72 | 17.11 |
| T71 | −1.58 | 13.28 | 2.04 |

TABLE 2-continued

Positions of tetrahedral (T) atoms for the ITQ-40 structure.

| Atom | x | y | z |
|---|---|---|---|
| T72 | 11.37 | 4.74 | 1.01 |
| T73 | 4.09 | 8.93 | 2.04 |
| T74 | 6.62 | 1.98 | 1.01 |
| T75 | −2.51 | 6.19 | 2.04 |
| T76 | 6.61 | 7.48 | 1.01 |

Although the Cartesian coordinates given in Table 2 may accurately reflect the positions of tetrahedral atoms in an idealized structure, the true structure can be more accurately described by the connectivity between the framework atoms as shown in Table 1 above.

Another way to describe this connectivity is by the use of coordination sequences as applied to microporous frameworks by W. M. Meier and H. J. Moeck, in the Journal of Solid State Chemistry 27, p. 349 (1979). In a microporous framework, each tetrahedral atom, $N_0$, (T-atom) is connected to $N_1=4$ neighboring T-atoms through bridging atoms (typically oxygen). These neighboring T-atoms are then connected to $N_2$ T-atoms in the next shell. The $N_2$ to atoms in the second shell are connected to $N_3$ T-atoms in the third shell, and so on. Each T-atom is only counted once, such that, for example, if a T-atom is in a 4-membered ring, at the fourth shell the $N_0$ atom is not counted second time, and so on. Using this methodology, a coordination sequence can be determined for each unique T-atom of a 4-connected net of T-atoms. The following line lists the maximum number of T-atoms for each shell.

$$N_0=1\ N_1 \leq 4\ N_2 \leq 12\ N_3 \leq 36\ N_k \leq 4\cdot 3^{k-1}$$

Table 3 provides the coordination sequence for ITQ-40 structure.

TABLE 3

| Atom Number | Atom Label | Coordination Sequence | | | | | | | | | | | | |
|---|---|---|---|---|---|---|---|---|---|---|---|---|---|---|
| 1 | T1 | 4 | 9 | 16 | 21 | 30 | 45 | 62 | 81 | 115 | 139 | 156 | 190 | 228 |
| 2 | T2 | 4 | 9 | 16 | 24 | 30 | 42 | 61 | 86 | 110 | 145 | 170 | 183 | 210 |
| 3 | T3 | 4 | 11 | 13 | 21 | 32 | 48 | 65 | 91 | 110 | 127 | 152 | 190 | 235 |
| 4 | T4 | 4 | 8 | 13 | 20 | 28 | 44 | 67 | 91 | 114 | 124 | 143 | 185 | 241 |
| 5 | T5 | 3 | 9 | 15 | 15 | 31 | 45 | 60 | 93 | 102 | 120 | 144 | 180 | 220 |

The invention also includes a method of synthesizing a crystalline silicate composition of ITQ-40 having the diffraction pattern similar to FIG. 2 by mixing together a source of silica, preferably a source of silica and a source of tetravalent metal, Y, an organic structure directing agent (SDA), R, water, a source of fluoride, F, and optionally a metal, X, with a composition, in terms of mole ratios, within the following ranges:

| | |
|---|---|
| $R/YO_2$ | 0.01-1.0 |
| $H_2O/YO_2$ | 0.50-50.0 |
| $X/YO_2$ | 0.00-0.2 |
| $F/YO_2$ | 0.01-2.0 | and preferably within the following ranges:

| | |
|---|---|
| R/YO$_2$ | 0.10-0.5 |
| H$_2$O/YO$_2$ | 1.00-5.0 |
| X/YO$_2$ | 0.00-0.1 |
| F/YO$_2$ | 0.1-0.5 | and X is any metal capable of tetrahedral coordination, more preferably X is one or more of B, Al, Ga, Fe, Li, Be, P, Zn, Cr, Mg, Cu, Co, Ni, Mn, As, In, Sn, or Sb, and more preferably X is Al or B, and Y is Si alone or in combination with any other tetravalent metal capable of tetrahedral coordination, preferably Ti, Zr, or Ge.

Organic structure directing agents are organic compounds that are sometimes added to the synthesis mixture of molecular sieves and zeolites. The addition of these organic compounds can alter the course of the crystallization to cause the formation of a material having a different structure, composition, crystal size or shape than that made in the absence of these compounds. Typical structure directing agents are tetraalkyammonium cations, tetraalkylphosphonium cations, organic amines and cyclic ethers. The organic structure directing agent, R, for the synthesis of ITQ-40 is preferably diphenyldimethylphosphonium hydroxide or diphenyldiethylphosphonium hydroxide.

Sources of silica can be colloidal, fumed or precipitated silica, silica gel, sodium or potassium silicates, or organic silicon such as tetraethylorthosilicate, etc. Sources of metal can be boric acid, germanium (IV) ethoxide, germanium oxide, germanium nitrate, aluminum nitrate, sodium aluminate, aluminum sulfate, aluminum hydroxide, aluminum chloride and various salts of the metals X such as iron nitrate, iron chloride, and gallium nitrate, etc. Sources of fluoride can be hydrofluoric acid, ammonium fluoride, ammonium bifluoride or the like.

It may be necessary to remove a portion of the water from the initial reaction mixture. This may be accomplished by techniques known to those skilled in the art. Such techniques include, but are not limited to, evaporation in air with or without heating, purging with a source of dry air or other suitable gas, vacuum distillation and freeze drying.

The mixture is then heated at a temperature ranging from about 50° C. to about 250° C., preferably to about 100° C. to about 175° C., for a time sufficient to crystallize the silicate, preferably for about 1 hr to about 60 days, more preferably for about 0.5 days to about 7 days.

As synthesized, ITQ-40 can have a composition of aR:YO$_2$:bX$_2$O$_3$:cF:dH$_2$O, where a can have a value ranging from about 0.01 to about 0.5, R is an organic structure directing agent; b can have a value of from 0 to about 0.2, Y is Si alone or in combination with any other tetravalent metal capable of tetrahedral coordination, preferably Ti, Zr, or Ge; and X is any metal capable of tetrahedral coordination, preferably X is B, Al, Ga, Fe, Li, Be, P, Zn, Cr, Mg, Cu, Co, Ni, Mn, As, In, Sn, or Sb, and more preferably X is Al or B; c can have a value ranging from about 0.01 to about 0.5, F is a source of fluoride, and d can have a value from 0 to about 1. This compound has a unique X-ray diffraction pattern whose essential reflections are given in Table 4 and shown in FIG. 2.

TABLE 4

Powder X-ray diffraction pattern for ITQ-40

| d (Å) | Relative intensity (%) |
|---|---|
| 16.6-15.7 | 30-80 |
| 14.6-13.9 | 60-100 |
| 13.3-12.7 | 30-80 |
| 7.40-7.22 | 5-40 |
| 7.09-6.93 | 5-40 |
| 6.58-6.43 | 5-40 |
| 5.42-5.32 | 5-40 |
| 4.002-3.949 | 5-40 |
| 3.970-3.918 | 5-40 |
| 3.492-3.452 | 5-50 |
| 3.119-3.087 | 5-40 |
| 3.063-3.032 | 5-40 |

Figure 3:
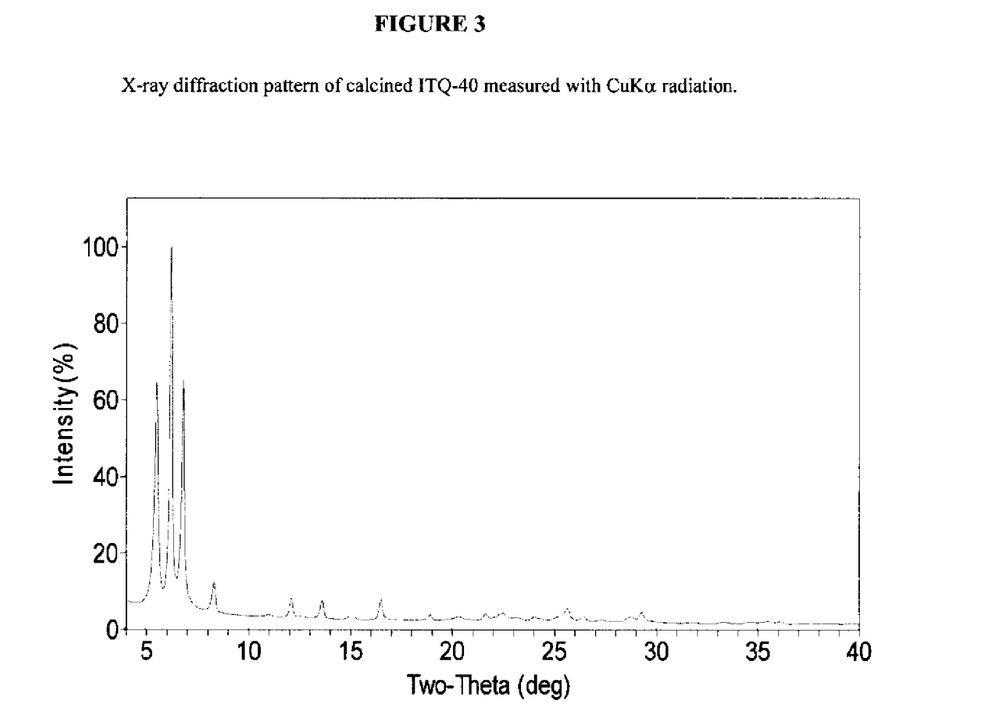
FIG. 3 is a representation of the X-ray diffraction pattern of calcined ITQ-40 measured with CuKα radiation.

In most applications, it is desirable to remove the structure directing agent, water and fluoride before using ITQ-40 as a catalyst or adsorbent. This can be accomplished by calcining ITQ-40 at elevated temperatures ranging from about 100 to about 600° C. in the presence of oxygen and/or ozone, or by ion exchange techniques. When calcining ITQ-40 at temperatures greater than 200° C., it may be advantageous to initially perform the calcination in the absence of oxygen or ozone. In the calcined form, ITQ-40 can have a composition of YO$_2$: bX$_2$O$_3$ where b ranges from 0 to about 0.2, Y is Si alone or in combination with any other tetravalent metal capable of tetrahedral coordination, preferably Ti, Zr, or Ge., and X is any metal capable of tetrahedral coordination, preferably X is one or more of B, Al, Ga, Fe, Li, Be, P, Zn, Cr, Mg, Cu, Co, Ni, Mn, As, In, Sn, or Sb, and more preferably X is Al or B. This calcined compound has a unique X-ray diffraction pattern whose essential reflections are given in Table 5 and shown in FIG. 3.

TABLE 5

Powder X-ray diffraction pattern for calcined ITQ-40

| d (Å) | Relative intensity (%) |
|---|---|
| 16.5-15.6 | 60-100 |
| 14.6-13.9 | 60-100 |
| 13.3-12.7 | 50-90 |
| 10.8-10.4 | 5-40 |
| 7.41-7.23 | 1-20 |
| 6.57-6.43 | 1-20 |
| 5.43-5.33 | 1-20 |
| 3.976-3.924 | 1-20 |
| 3.560-3.518 | 1-20 |
| 3.497-3.457 | 1-20 |
| 3.065-3.035 | 1-20 |

To the extent desired and depending on the value of b in the molar ratio YO$_2$:bX$_2$O$_3$ of the material, any cations present in the as-synthesized ITQ-40 can be replaced in accordance with techniques well known in the art by ion exchange with other cations. Preferred replacing cations include metal ions, hydrogen ions, and hydrogen precursor, e.g., ammonium ions and mixtures thereof. Particularly preferred cations are those which tailor the catalytic activity for certain hydrocarbon conversion reactions. These include hydrogen, rare earth metals and metals of Groups IIA, IIIA, IVA, VA, IB, IIB, IIIB, IVB, VB, VIB, VIIB and VIII of the Periodic Table of the Elements.

The crystalline material of this invention can be used to catalyze a wide variety of chemical conversion processes, particularly organic compound conversion processes, including many of present commercial/industrial importance. Examples of chemical conversion processes which are effectively catalyzed by the crystalline material of this invention, by itself or in combination with one or more other catalytically active substances including other crystalline catalysts, include those requiring a catalyst with acid activity.

Thus, in its active form ITQ-40 can exhibit a high acid activity, which can be measured with the alpha test. Alpha value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an Alpha of 1 (Rate Constant=0.016 sec$^{-1}$). The Alpha Test is described in U.S. Pat. No. 3,354,078; in the *Journal of Catalysis* 4, 527 (1965); 6, 278 (1966); and 61, 395 (1980), each incorporated herein by reference as to that description. The experimental conditions of the test used herein include a constant temperature of 538° C. and a variable flow rate as described in detail in the *Journal of Catalysis* 61, 395 (1980).

When used as a catalyst, the crystalline material of the invention may be subjected to treatment to remove part or all of any organic constituent. This is conveniently effected by thermal treatment in which the as-synthesized material is heated at a temperature of at least about 100° C. for at least 1 minute and generally not longer than 20 hours. While subatmospheric pressure can be employed for the thermal treatment, atmospheric pressure is desired for reasons of convenience. The thermal treatment can be performed at a temperature up to about 927° C. The thermally treated product, especially in its metal, hydrogen and ammonium forms, is particularly useful in the catalysis of certain organic, e.g., hydrocarbon, conversion reactions.

When used as a catalyst, the crystalline material can be intimately combined with a hydrogenating component such as tungsten, vanadium, molybdenum, rhenium, nickel, cobalt, chromium, manganese, or a noble metal such as, but not limited to, platinum or palladium where a hydrogenation-dehydrogenation function is to be performed. Such component can be in the composition by way of co-crystallization, exchanged into the composition to the extent a Group IIIA element, e.g., aluminum, is in the structure, impregnated therein or intimately physically admixed therewith. Such component can be impregnated in or on to it such as, for example, by, in the case of platinum, treating ITQ-40 with a solution containing a platinum metal-containing ion. Thus, suitable platinum compounds for this purpose include chloroplatinic acid, platinous chloride and various compounds containing the platinum amine complex.

The crystalline material of this invention, when employed either as an adsorbent or as a catalyst in an organic compound conversion process should be dehydrated, at least partially. This can be done by heating to a temperature in the range of 100° C. and 370° C. in an atmosphere such as air, nitrogen, etc., and at atmospheric, subatmospheric or superatmospheric pressures for between 30 minutes and 48 hours. Dehydration can also be performed at room temperature merely by placing the ITQ-40 in a vacuum, but a longer time is required to obtain a sufficient amount of dehydration.

As in the case of many catalysts, it may be desirable to incorporate the new crystal with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction with the new crystal, i.e., combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present crystal also include inorganic oxides, such as silica, zirconia, titania, magnesia, beryllia, alumina, and mixtures thereof.

In addition to the foregoing materials, the new crystal can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of finely divided crystalline material and inorganic oxide matrix vary widely, with the crystal content ranging from about 1 to about 90 percent by weight and more usually, particularly when the composite is prepared in the form of beads, in the range of about 2 to about 80 weight percent of the composite.

In order to more fully illustrate the nature of the invention and the manner of practicing same, the following example is presented.

EXAMPLES

Example 1

Synthesis of Diphenyldimethylphosphonium Hydroxide and Diphenyldiethylphosphonium Hydroxide Diphenyldimethylphosphonium Hydroxide Diphenyldimethylphosphonium hydroxide (Me$_2$Ph$_2$POH) was obtained by methylation of diphenylphosphine with methyl iodide in chloroform in the presence of potassium carbonate, K$_2$CO$_3$, as described in U.S. Pat. No. 7,527,782, for the synthesis of ITQ-27, herein incorporated by reference.

10.80 g of diphenylphosphine were dissolved in 50 ml of isopropanol under nitrogen atmosphere. 9.55 g of potassium carbonate sesquihydrate were then added to the mixture and the mixture was stirred. Finally, 24.60 g of methyl iodide were added dropwise. After 48 hours, 8 g of methyl iodide were added again and the mixture was left for a total time of five days.

Then, the isopropanol was removed by rotoevaporation and filtration. The product was then dissolved in chloroform. The chloroform was then evaporated and the solid washed with diethyl ether and dried under vacuum. 18.426 g of diphenyldimethylphosphonium iodide were obtained (93.2% wt. Yield).

Next, 18.426 g of diphenyldimethylphosphonium iodide was dissolved in water and then converted to the corresponding hydroxide with 58.15 g of an anionic exchange resin in batch overnight, yielding 183.52 g of a 0.27 M solution of diphenyldimethylphosphonium hydroxide (92% of exchange yield). This diphenyldimethylphosphonium hydroxide was used as SDA source.

Diphenyldiethylphosphonium Hydroxide

Diphenyldiethylphosphonium hydroxide ($Et_2Ph_2POH$) was obtained by ethylation of diphenylphosphine with ethyl iodide in ethanol in the presence of potassium carbonate, $K_2CO_3$.

50 g of diphenylphosphine were mixed with 150 ml of ethanol under nitrogen atmosphere. 37.12 g of potassium carbonate were then added to the mixture and the mixture was stirred. Finally, 125.73 g of ethyl iodide were added dropwise. After 48 hours at 50° C., the ethanol was removed. The product was then dissolved in chloroform. The chloroform was evaporated and the solid washed with diethyl ether and dried under vacuum. 98.45 g of diphenyl-diethyl-phosphonium iodide were obtained (98.5% wt. yield)

This 98.45 g of diphenyldiethylphosphonium iodide was then dissolved in water, and converted to the corresponding hydroxide with 270 g of an anionic exchange resin in batch overnight, yielding 271.75 g of a 0.94 M solution of diphenyldiethylphosphonium hydroxide (96% of exchange yield) The diphenyldiethylphosphonium hydroxide was used as SDA source.

Example 2

Synthesis of ITQ-40

A gel of composition:

$$0.5SiO_2:0.5GeO_2:0.4SDA(OH):0.4NH_4F:1H_2O$$

was prepared by dissolving 4.16 g of germanium oxide in 34.04 g of a diphenyldiethylphosphonium hydroxide solution (0.94 mol OH/Kg) while stirring. Then 8.35 g of tetraethylorthosilicate (TEOS) were hydrolized in the solution and stirred at room temperature to evaporate the formed ethanol and water until the gel composition was reached. The final weight was 16.35 g of gel. The gel was heated for 1 day at 175° C. in Teflon lined stainless steel autoclaves. The resulting product was ITQ-40 with a Si/Ge ratio of about 1. The diffraction pattern of ITQ-40 is given in Table 6.

TABLE 6

Powder X-ray diffraction pattern for as synthesized ITQ-40

| 2-Theta | d (Å) | Relative intensity (%) |
|---|---|---|
| 5.48 | 16.11 | 64 |
| 6.22 | 14.21 | 100 |
| 6.79 | 13.02 | 70 |
| 8.29 | 10.66 | 7 |
| 10.80 | 8.19 | 4 |
| 10.98 | 8.05 | 6 |
| 12.10 | 7.31 | 12 |
| 12.45 | 7.10 | 9 |
| 12.62 | 7.01 | 11 |

TABLE 6-continued

Powder X-ray diffraction pattern for as synthesized ITQ-40

| 2-Theta | d (Å) | Relative intensity (%) |
|---|---|---|
| 13.60 | 6.50 | 17 |
| 14.94 | 5.93 | 5 |
| 16.49 | 5.37 | 11 |
| 17.38 | 5.10 | 4 |
| 18.45 | 4.805 | 6 |
| 18.92 | 4.688 | 8 |
| 20.26 | 4.381 | 7 |
| 20.71 | 4.287 | 1 |
| 21.63 | 4.106 | 4 |
| 22.06 | 4.026 | 7 |
| 22.34 | 3.976 | 10 |
| 22.53 | 3.944 | 13 |
| 22.96 | 3.870 | 7 |
| 23.26 | 3.821 | 3 |
| 24.02 | 3.703 | 4 |
| 24.30 | 3.660 | 2 |
| 25.05 | 3.552 | 5 |
| 25.64 | 3.472 | 20 |
| 26.42 | 3.371 | 6 |
| 27.39 | 3.254 | 2 |
| 28.01 | 3.183 | 1 |
| 28.74 | 3.103 | 11 |
| 29.28 | 3.048 | 15 |
| 29.78 | 2.998 | 4 |
| 30.43 | 2.935 | 3 |
| 30.87 | 2.895 | 2 |
| 31.54 | 2.835 | 3 |
| 31.99 | 2.796 | 2 |
| 33.37 | 2.683 | 4 |
| 34.71 | 2.582 | 6 |
| 35.48 | 2.528 | 6 |
| 36.11 | 2.485 | 4 |
| 37.45 | 2.400 | 4 |
| 38.35 | 2.345 | 3 |
| 38.80 | 2.319 | 4 |
| 39.67 | 2.270 | 6 |

Example 3

Synthesis of Aluminum Containing ITQ-40

A gel of composition:

$$0.5SiO_2:0.5GeO_2:0.025Al_2O_3:0.4SDA(OH):0.4NH_4F:1H_2O$$

was prepared by dissolving 2.28 g of germanium oxide in 17.08 g of a diphenyldiethylphosphonium hydroxide solution (0.94 mol OH/Kg) while stirring. Then 0.223 g of aluminum isopropoxide were hydrolyzed in the solution while stirring at room temperature. Next, 3.03 g of Ludox AS-40 (DuPont) and 0.60 g of $NH_4F$ were added to the solution. The gel was stirred at room temperature to evaporate the excess water to arrive at the final gel composition.

The gel was then heated at 175° C. in a Teflon lined stainless steel autoclave for 1 day. The solid was filtered, washed and dried at 100° C. and the X-ray pattern shows that it corresponds to ITQ-40.

Example 4

Synthesis of Boron Containing ITQ-40

A gel of composition:

$$0.5SiO_2:0.5GeO_2:0.017B_2O_3:0.4SDA(OH):0.4NH_4F:1H_2O$$

was prepared in a manner similar to example 3 except that the aluminum isopropoxide was replaced with an appropriate amount of boric acid.

The gel was heated at 175° C. in Teflon lined stainless steel autoclaves for 1 day. The solid was filtered, washed and dried at 100° C. and the X-ray pattern shows that it corresponds to ITQ-40.

Example 5

Calcination of ITQ-40

A portion of ITQ-40 prepared according to Example 2 was subjected to calcination at 450° C. for 30 minutes in air. The sample was maintained in a dehydrated state by a flow of dry air at 30° C. Its diffraction pattern was measured and is given in Table 7.

TABLE 7

Powder X-ray diffraction pattern for calcined ITQ-40

| 2-Theta | d (Å) | Relative intensity (%) |
|---|---|---|
| 5.50 | 16.1 | 90 |
| 6.20 | 14.2 | 100 |
| 6.79 | 13.0 | 78 |
| 8.31 | 10.6 | 10 |
| 10.96 | 8.06 | 1 |
| 12.09 | 7.32 | 7 |
| 12.61 | 7.01 | 1 |
| 13.61 | 6.50 | 6 |
| 14.99 | 5.90 | 2 |
| 16.47 | 5.38 | 7 |
| 17.36 | 5.11 | 2 |
| 18.89 | 4.695 | 2 |
| 20.28 | 4.375 | 3 |
| 21.61 | 4.110 | 3 |
| 22.49 | 3.950 | 7 |
| 23.10 | 3.847 | 2 |
| 24.04 | 3.699 | 3 |
| 24.33 | 3.656 | 3 |
| 25.14 | 3.539 | 6 |
| 25.60 | 3.477 | 9 |
| 26.38 | 3.375 | 3 |
| 27.32 | 3.262 | 2 |
| 28.70 | 3.109 | 4 |
| 29.26 | 3.050 | 6 |
| 33.29 | 2.690 | 1 |
| 34.56 | 2.593 | 2 |
| 35.39 | 2.534 | 4 |
| 36.07 | 2.488 | 2 |
| 39.59 | 2.274 | 2 |

What is claimed is:

1. A synthetic crystalline material having a framework of tetrahedral atoms (T) connected by bridging atoms, the tetrahedral atom framework being defined by connecting the nearest tetrahedral (T) atoms in the manner shown in Table 1 of the specification.

2. The crystalline material of claim 1 wherein said tetrahedral atoms include one or more elements selected from the group consisting of Li, Be, B, Mg, Al, Si, P, Ti, Cr, Mn, Fe, Co, Ni, Cu, Zn, Zr, Ga, Ge, As, In, Sri, Sb.

3. The crystalline material of claim 1 wherein said bridging atoms include one or more elements selected from the group consisting of O, N, F, S, Se, and C.

4. A synthetic porous crystalline material, as synthesized, characterized by an X-ray diffraction pattern including the peaks as substantially set forth in Table 4 of the specification.

5. The crystalline material of claim 4 wherein said crystalline material as synthesized has a composition of $aR:YO_2:bX_2O_3:cF:dH_2O$, wherein a ranges from about 0.01 to about 0.5; R is an organic structure directing agent; b ranges from 0 to about 0.2; Y is Si alone or in combination with any other tetravalent metal capable of tetrahedral coordination; and X is any metal capable of tetrahedral coordination; c ranges from about 0.01 to about 0.5; F is a source of fluoride, and, d ranges from 0 to about 1.

6. The crystalline material of claim 5 wherein X is one or more of Li, Be, B, Mg, Al, P, Cr, Mn, Fe, Cu, Co, Ni, Cu, Zn, Ga, As, In, Sn, Sb.

7. The crystalline material of claim 5 wherein Y is Si alone or in combination with any other tetravalent metal capable of tetrahedral coordination.

8. A calcined dehydrated material characterized by an X-ray diffraction pattern including the most significant lines substantially, as set forth in Table 5 of the specification.

9. The calcined dehydrated material of claim 8 wherein said crystalline material has a composition $YO_2:bX_2O_3$, wherein where b ranges from 0 to about 0.2; Y is Si alone or in combination with any other tetravalent metal capable of tetrahedral coordination; and, X is any metal capable of tetrahedral coordination.

10. The crystalline material of claim 9 wherein X is one or more of Li, Be, B, Mg, Al, P, Cr, Mn, Fe, Cu, Co, Ni, Cu, Zn, Ga, As, in, Sn, Sb.

11. The crystalline material of claim 9 wherein Y is Si alone or in combination with one or more of Ti, Zr, or Ge.

12. A product produced by synthesizing a crystalline silicate composition of ITQ-40 having the diffraction pattern similar to Table 4 by mixing together a source of silica, a source of tetravalent metal, an organic structure directing agent (R), a source of fluoride, water, and optionally a metal (X), with a composition, in terms of mole ratios, within the following ranges:

| | |
|---|---|
| $R/YO_2$ | 0.01-1.0 |
| $H2O/YO_2$ | 0.50-50.0 |
| $X/YO_2$ | 0.00-0.2 |
| $F/YO_2$ | 0.01-2.0 | and wherein X is any metal capable of tetrahedral coordination and Y is Si alone or in combination with any other tetravalent metal capable of tetrahedral coordination; and, heating the mixture for a time and temperature to crystallize the composition, wherein said organic structure directing agent is diphenyldimethylphosphonium.

13. The product of claim 12 wherein Y is Si alone or in combination with one or more of Ti, Zr, or Ge.

14. The product of claim 13 wherein the composition, in terms of mole ratios, falls within the following ranges:

| | |
|---|---|
| R/YO$_2$ | 0.10-0.5 |
| H2O/YO$_2$ | 1.00-5.0 |
| X/YO$_2$ | 0.00-0.1 |
| F/YO$_2$ | 0.01-0.5. |

15. A product produced by synthesizing a crystalline silicate composition of ITQ-40 having the diffraction pattern similar to Table 4 by mixing together a source of silica, a source of tetravalent metal, an organic structure directing agent (R), a source of fluoride, water, and optionally a metal (X), with a composition, in terms of mote ratios, within the following ranges:

| | |
|---|---|
| R/YO$_2$ | 0.01-1.0 |
| H2O/YO$_2$ | 0.50-50.0 |
| X/YO$_2$ | 0.00-0.2 |
| F/YO$_2$ | 0.01-2.0 | and wherein X is any metal capable of tetrahedral coordination and Y is Si alone or in combination with any other tetravalent metal capable of tetrahedral coordination; and, heating the mixture for a time and temperature to crystallize the composition, wherein said organic structure directing agent is diphenyldiethylphosphonium.

16. The product of claim 15 wherein Y is Si alone or in combination with one or more of Ti, Zr, or Ge.

17. The product of claim 16 wherein the composition, in terms of mole ratios, falls within the following ranges:

| | |
|---|---|
| R/YO$_2$ | 0.10-0.5 |
| H2O/YO$_2$ | 1.00-5.0 |
| X/YO$_2$ | 0.00-0.1 |
| F/YO$_2$ | 0.01-0.5. |

* * * * *